Sept. 25, 1934.   J. BIJUR   1,974,415
LUBRICATION
Original Filed June 25, 1925   2 Sheets-Sheet 1
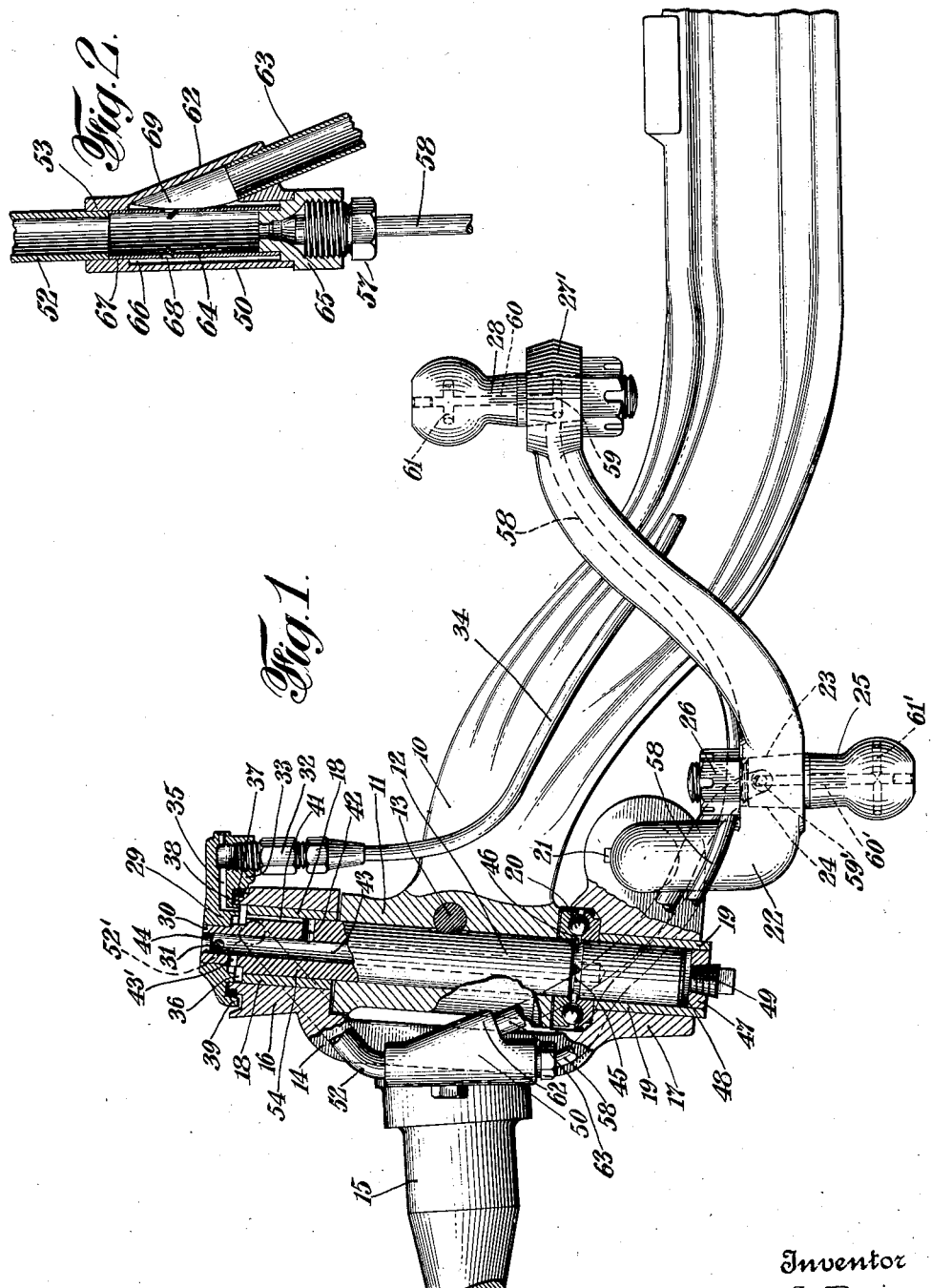
Inventor
Joseph Bijur
By his Attorneys
Dean, Fairbank, Obright & Hirsch

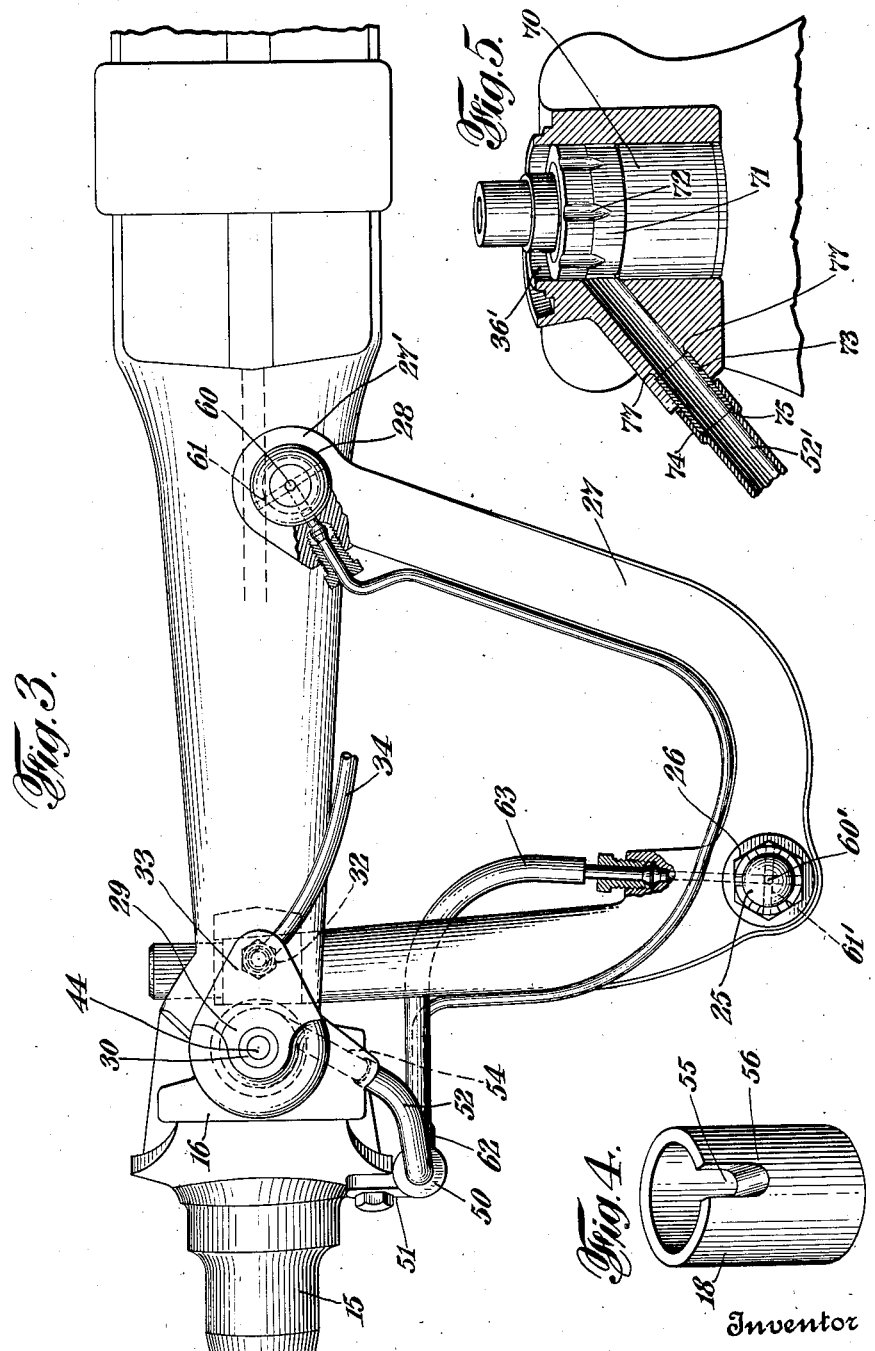

Patented Sept. 25, 1934

1,974,415

UNITED STATES PATENT OFFICE 1,974,415

LUBRICATION

Joseph Bijur, New York, N. Y., assignor to Auto Research Corporation, a corporation of Delaware Application June 25, 1925, Serial No. 39,415
Renewed October 1, 1930

50 Claims. (Cl. 184—7)

While certain of the features of my present invention are applicable to gravity flow systems broadly, the invention has a preferred use in association with pressure lubricating systems and more especially for delivering lubricant by gravity flow from a pressure line to the bearing or bearings of a structure having a swiveled or other movable relation with respect to the main lubricated structure, more especially where it is unfeasible or undesirable to convey the lubricant under pressure past or across such swivel or other connection.

The invention is shown embodied in the steering knuckle of a motor vehicle and provides convenient means for reliably supplying with clean oil, all or any number of the bearings carried by or associated with said knuckle and without the need for selective manipulations by direct manual access to the individual bearings and without the use of any protruding or projecting conduits likely to be torn loose in ordinary use of the vehicle.

The knuckle inlet and the various bearings are all substantially unitary with the knuckle and preferably rigid seamless metal connecting pipe extends along structural parts of the knuckle between the inlet and the bearings, although where practicable, the structure of the knuckle may be bored, to provide some or all of the lubricant conduits.

Inasmuch as the bearings of the steering knuckle are not at a common level, the tie rod bearing being usually lower than the king pin bearings and both the former and part of the latter of these usually lower than the drag link bearing, a siphoning action may ensue where the conduits to two or more of these bearings are supplied by gravity flow from a common source. Such action would cause intermittent flooding of the lower of the bearings by drawing lubricant from the line leading to the higher, which latter would, accordingly, receive too little oil and it is one of the objects of the invention to avoid such objectionable siphoning.

The desired result is accomplished broadly by obviating one of the conditions pre-requisite to siphoning, that is, by precluding the transmission, through the pipe bore of the suction effect of a considerable column of lubricant leading to the lower of the bearings.

While one mode of obviating such siphoning is to vent the pipe system at or near the common source, supplying the knuckle bearings, the need for precautions would arise to prevent clogging such vent with dust or dirt. Moreover, such vent unless specially constructed and arranged, would be likely to admit dirt or dust to the bearing surfaces to be lubricated.

It is, accordingly, an object of the invention to provide a mechanical device, as for instance, a steering knuckle, which though effectively sealed against the entry of dust to the bearing surfaces thereof, will yet preclude siphoning through a lower bearing of lubricant from a conduit leading to a higher bearing and without blocking or impeding unobstructed gravity flow to the bearings.

I prefer to employ, an appropriate compressible gasket at the swivel mount of the knuckle, which in effectively excluding dirt and dust may, however, preclude the venting of the pipe line, by the presence of an oil film bridging the gaps between the closely fitting parts.

Even though the downwardly extending pipe line communicated with only one bearing, for instance, the tie rod bearing, without communication with any other oil duct, from which it might siphon, irregularity of operation might be encountered by the lubricant admitted thereto being arrested in the pipe until after several lubricating operations, a column of sufficient weight had accumulated therein, to flow out so that the bearing would intermittently receive an oversupply of oil stored in the pipe in several intervening operations.

Both siphoning and arresting of flow are precluded in such arrangement according to my invention by the expedient of arranging the downwardly extending pipe or bore, so that oil pouring into the upper end thereof will not fill it solidly full to any considerable extent but will pass around the air in the pipe or bore instead of displacing the air. For this purpose, part or all of the pipe or conduit leading to the lower bearing is formed of diameter sufficiently large to allow the oil to be admitted thereto without driving the air ahead of it, and a continuous column of lubricant could not collect in a sufficient portion of the length of downwardly extending pipe or conduit to exert a siphoning action on the conduit leading to a higher bearing.

By the arrangement set forth, it is possible and preferable where a pivot stud is employed for the tie rod, for instance, to form the bores therein of the minimum diameter desired, since the weight of a continuous column of lubricant collecting in such bores would not be sufficient to effect a siphoning action.

In many constructions, the tie rod bearing, which is nearer to the king pin and extends to a level substantially lower than that of the drag link bearing, would tend to receive most of the lubricant passed from a common source on the knuckle and it is an object to assure correct division of the lubricant. One desirable way of accomplishing this result is to provide a dividing fitting arranged to tend to supply all of the lubricant to the drag link bearing and having small ports, past which the lubricant must flow in its passage to the drag link stud and through which some will escape to supply the tie rod stud.

In many steering knuckles, the steering arm protruding from the knuckle droops downward between its ends or has an upwardly extending bearing outlet or stud at its outer end at a level higher than the lowermost part of the arm. Where lubricant is conveyed to said bearing through a conduit lengthwise of the arm, some would, of course, become trapped therein below the level of the bearing, blocking the exit of air through said part of the pipe.

It is an object of the invention to provide a gravity flow lubricating system involving an oil-trapping conduit, such for instance, as may extend along the steering arm of a knuckle, in which admission of lubricant at the inlet to the conduit shall effect prompt delivery of lubricant to the bearing from the trapped volume and without obstruction or hindrance by air in the path of the lubricant to be admitted.

The desired result may be accomplished by the expedient of making the pipe of such character or of such diameter at the inlet end thereof down to a level at least as low as that to which the lubricant is trapped therein, that air and lubricant can pass concurrently therethrough, that is, so that the air can escape through the inlet end of the pipe as the lubricant is admitted thereinto.

While the entire length of the steering arm or drag link pipe may be made of the larger diameter, it may be desirable to so form only the part thereof down to the level of the exit, the rest of the pipe in which the lubricant is trapped being of smaller diameter. In a preferred embodiment, the branch of the dividing fitting that leads to the steering arm conduit may be of the larger diameter and extend to a level as low or lower than that of the steering arm bearing or other exit.

The same principle that governs the choice of the large diameter pipe to lead to the tie rod stud is carried out in providing a large diameter bore in the king pin through which the lower bearing of the latter is supplied with lubricant.

Such subject matter as this application discloses in common with that of my copending applications Serial No. 202,995, 202,996 and 202,997, all filed July 2, 1927, is claimed in said three applications, except that the complete lubrication of the king pin either alone or in combination with the lubrication of some or all of the knuckle bearings is part of the subject matter claimed herein.

In the accompanying drawings in which are shown one or more of various possible embodiments of the several features of the invention, Fig. 1 is a front elevation with parts in longitudinal section of a steering knuckle, Fig. 2 is a detail longitudinal sectional view of a dividing fitting, Fig. 3 is a plan view of Fig. 1.

Fig. 4 is a perspective view of the upper king pin bushing, and;

Fig. 5 is a fragmentary sectional view of a modification.

In Figs. 1 and 2 is shown a fragmentary view of a steering knuckle installation, illustratively of the reverse Elliott type, which comprises an axle end 10 having an eye 11 through which extends a king pin 12 pinned rigidly to the axle by the key 13. The bearing ends of the king pin are straddled by the clevis jaws 16 and 17 of a knuckle 14 having a wheel spindle 15, said jaws having bushings 18 and 19 therein providing bearing surfaces for the upper and lower ends respectively of the king pin. In the embodiment shown, the axle has a thrust ball bearing 20 sustained on the lower of the knuckle clevises. The knuckle shown has rigid therewith connected thereto, for instance by the key 21, a combined tie rod and drag link arm 22 provided with a tapered socket 23, in which is secured the correspondingly tapered shank 24 of a downwardly extending ball stud 25 which provides a swivel bearing at its lower end for the corresponding socket (not shown) of the tie rod. The ball stud 25 is secured in place by an appropriate nut 26 threaded on the upper end thereof. At the outer end of the combined arm 22 which is curved to droop downwardly from the knuckle and thence extends upwardly, there is fixed a ball stud 28 which extends upward therefrom, but is otherwise similar to stud 25 for the tie rod bearing. The construction of knuckle thus far described is in itself not my invention which is concerned largely with the lubrication of said knuckle.

To lubricate the knuckle, I have provided a lubricant inlet cap 29 having a central aperture within which fits the reduced upper end 30 of the king pin which is made to protrude above the upper end of the upper clevis jaw 16. A cross pin 31 serves to key the cap to the upper end of the king pin, so that the cap is accordingly held rigid with the axle.

The lubricant is admitted to the cap 29 preferably through an appropriate flow controlling fitting 32 which may be threaded into the lower face of an integral lug 33 of the cap that protrudes laterally toward the axle side thereof, which in this embodiment is illustratively in turn, supplied through a pipe 34 along the axle. The lubricant is supplied under pressure from a source (not shown) on the vehicle frame to the control fitting, which may be a drip plug of the type disclosed in my prior Patent No. 1,632,772 of June 14, 1927 and in which the pressure is preferably absorbed so that lubricant passes therebeyond to the knuckle at a measured rate, so slow that it will not flood the cavity in the cap.

The supply cap is bored as at 35 to drip into an annular well 36 formed about the king pin and immediately above the bushing 18 over the upper king pin bearing, from which well lubricant is supplied to the king pin bearing surface, to the tie rod and to the steering arm or drag link in parallel, as hereinafter described.

In order to prevent dust and dirt from entering through the gap between the stationary cap 29 and the rocking or oscillating upper clevis 16, I have provided the construction shown, in which an annular compression gasket 37 encircles an integral upstanding ledge 38 on the upper clevis and is itself encircled by a downwardly extending annular flange 39 formed integral with the cap 29. The gasket is of thickness such that it is compressed when the pin 31 is applied to secure the inlet cap to the king pin.

In the preferred embodiment, a small flat 41 is formed in the king pin at one side of the bushing in communication with the well 36, affording a restricted or dammed passage through which lubricant would spread to supply the bearing in the upper bushing 18, the excess being drained through a radial bore 42 into an axial bore 43 along the length of the king pin, plugged at its upper end at 44, which latter bore extends downward to substantially the level of the lower race of the ball bearing 20. A bore 45 radially of the king pin and near the lower end of said axial bore 43 delivers lubricant outward to groove 46 encircling the king pin from which lubricant is supplied to the ball bearing, the excess of such lubricant passing downward to lubricate the lower bearing 19 of the king pin. A press-fitted plug 47 closes the lower end of the bushing 19 and defines a small cavity 48 in which lubricant may collect without leak. The lower end of the pivot pin is thus in a closed cup, so that the lubricant rising up in this cup about the king pin bearing oils the thrust bearing 20 before it overflows to the road. A central aperture in the plug is closed by a screw plug 49 which may be removed at will for admission of a tool to drive out the king pin in dis-assembly.

The annular well 36 also drains to a piping system from which the tie rod and drag link bearings are supplied. This piping system preferably includes a dividing fitting 50 secured as by an integral lug 51 upon the knuckle adjacent the king pin. The dividing fitting is supplied from a short length of pipe 52 which may be press-fitted and soldered as at 53 into the inlet of said fitting. The upper end of pipe 52 preferably extends into an oblique bore 54 in the upper knuckle clevis with the uppermost part of its wall 52' substantially at the level of the floor of well 36 and terminating at the outer surface of the bushing 18, which latter is preferably formed with a notch 55 having an oblique lower edge 56 along which lubricant from the well 36 can drain to the pipe 52. The dividing fitting 50 is illustratively shown with a main passage extending the length thereof to the lower end of which there is affixed as by means of a compression coupling 57 a length of pipe 58 extending along the structure of the knuckle and along the length of the steering arm 22 through the eye 27' in which the ball stud 28 is mounted. The ball stud 28 is supplied from pipe 58 by radial bore 59 communicating with axial bore 60 which delivers through radial bores 61 in the ball stud 28. The dividing fitting 50 is also formed with a branch outlet 62 into the outlet end of which is fitted and preferably soldered in place a pipe 63, which extends downward along the structure of the knuckle and along the tie rod arm 22, to deliver to the tie rod stud 25 which is bored in the same manner as the drag link stud, corresponding parts being designated by the same reference numerals primed.

Inasmuch as the tie rod bearing extends to a level lower than that of the steering arm or drag link and is in closer proximity to the king pin, it would in the absence of special precautions tend to receive more of the oil than the latter. I have provided a construction of dividing fitting by which this is precluded and the division is effected in the first instance substantially precisely in accordance with requirements. For this purpose, the main branch of the dividing fitting along which the lubricant would naturally tend to flow, leads to the steering arm or drag link conduit and preferably along a length of pipe 64 in said branch affixed to a plug 65 which, in turn, is firmly pressed into the outlet end of said branch and affords a socket for the threaded bushing of the compression coupling 57. Pipe 64 has clearance 66 with respect to the bore of the fitting 50 but fits snugly at its inlet end at the correspondingly reduced inlet 67 of the fitting. The pipe 64 thus forms a stop, as shown, for the outlet end of the pipe length 52. The tube 64 shuts off the supply of lubricant to the branch 62, from which the tie rod bearing is supplied, except for one or more small outlets 68 formed in the length of said tube in communication with the tie rod feeding branch 62. These outlets may constitute small triangular tangs 68 struck inward from the length of the pipe, the number of said tangs depending on the proportion of lubricant desired to be intercepted thereat.

The tube 64 is made of diameter so large that the lubricant would in being fed from the source of supply, tend to trickle down along the wall thereof, so that a small fraction of said lubricant would be intercepted at tangs 68 and directed outward for delivery to the tie rod bearing. The tube 64 terminates at a level below the inlet to the tie rod pipe 63, thereby providing an annular cavity 69 in the fitting in which the lubricant supplied through the tang openings 68, will collect and overflow into the branch 62 for passage on to the tie rod after reaching the level of the upper end of the tie rod pipe 63.

Although the knuckle rotates in cap 29 during steering, oil held in place by capillarity will bridge the gap between the knuckle and the cap, thus preventing the entry of air. Accordingly, unless precluded or offset by appropriate construction or arrangement of parts, the bearings at lower level, such as the tie rod bearing, would siphon lubricant from bearings at higher level, as for instance, from the king pin or drag link bearings, or the lower king pin bearing might siphon from the higher drag link bearing, were the lubricant at any time to form in a continuous column in one of the conduits to a lower bearing of sufficient weight or height to draw lubricant from the conduit leading to the higher bearing. The weight of uninterrupted column in descending to the tie rod bearing, for instance, would draw with it some or all of the lubricant in the steering arm conduit, depleting the drag link bearing or the conduit thereof and intermittently flooding the tie rod bearing.

In order to avoid such siphoning action to the tie rod bearing, the simple expedient is adopted of forming the pipe 63 which leads downward from the branch 62 of the dividing fitting to the base of the tie rod stud, of relatively large diameter, where oil of the grade of engine lubricating oil is used, not less than $\frac{3}{16}$ inches in bore. Lubricant in passing through said pipe will in that case trickle downward along a side thereof without ever filling the cross-section of the bore of said pipe. Downward flow of lubricant, accordingly, occurs without driving the air contained in the pipe ahead of it. There is thus avoided a continuous column of lubricant in the downwardly extending pipe, of weight sufficient to cause a siphoning action upon the lubricant in the steering arm.

The bore 60' in the tie rod stud is preferably of small diameter in order to avoid removing too much metal from the ball stud. Bore 60' is of diameter so small that air and lubricant cannot pass each other, so that ordinarily it (as well as associated bores 59' and 61') may be filled with a column of lubricant. However, the height or weight of this column is far too little to exert an effective siphoning action upon the lubricant in conduit 58 leading to the steering arm. Moreover, in the construction shown, the volume of air in the pipe 52 and in the dividing fitting 50 intervening between the steering and the tie rod arm conduit is so great that no appreciable reduction in the air pressure therein would occur as lubricant escapes from the bore in the tie rod stud.

The bore 43 in the king pin, from which the thrust bearing 20 and the lower bearing surface 19 thereof are supplied, is also of relatively large diameter, as shown, and for the same reason as is the conduit 63, so that no continuous column of lubricant can form therein of height and accordingly, of weight sufficient to exert a siphonic action on the lubricant in the steering arm or drag link conduit. Inasmuch as the lubricant well 36 tends to block escape of air from bore 43, so that the entry of lubricant would be impeded, a venting bore 43' is provided through the reduced part of the king pin above the level of lubricant in well 36 through which air would pass to the well from the king pin bore, as lubricant is admitted to the latter from the well.

Inasmuch as lubricant is trapped in the U-shaped or drooping conduit 58 leading to the drag link bearing, and, therefore, blocks the escape of air through the length of said pipe, the difficulty may arise that air at the inlet end of the piping above the level of lubricant in pipe 58, may block the entry of lubricant to be admitted to pipe 58 and thereby interfere with the oiling of the steering arm or drag link bearing.

To obviate such air blocking, the dividing fitting 50 is disposed at such level that the large diameter tube 64 thereof previously described supplying the steering arm or drag link, extends down to a level no higher but preferably lower than the exit in the drag link bearing hole 61. The pipe 52 leading from well 36 to supply the fitting 50, also is made of diameter so large that lubricant and air will readily pass each other, so that when lubricant is admitted into the conduit 52 from the well 36, it will trickle downward along a wall thereof, thence along a wall of tube 64 without filling the cross-sectional area of the pipe or tube bore, the air displaced passing concurrently in opposite direction through the pipe or tube, upward into the well 36 to replace the lubricant that has entered the pipe from the well. In practice, it is found that with the use of oil ordinarily employed for engine lubrication, a bore of not less than $\frac{3}{16}$ inch is satisfactory. Thus, the lubricant admitted will readily flow without air blocking, down through the pipe 52 and the tube 64 to combine with the lubricant trapped in the conduit 58. As a consequence of the addition of lubricant at the inlet end of pipe 58, the level must rise at the outlet end, and, accordingly, lubricant will overflow through the ports 61 to the steering arm stud or drag link. It is desired in general, although this is not necessary, to use the smallest pipe consistent with operativeness and accordingly, as shown in the drawings, the pipe 58 may be of small diameter, for instance, $\frac{1}{8}$" internal bore, inasmuch as by the arrangement described, the entire length of this pipe is at all times filled with lubricant and air blocking cannot occur therein. No air blocking will occur in first applying lubricant to the new or dry equipment, since the lubricant once entering the small pipe will cause the air in advance thereof to pass on outward at the bearing end.

The operation may be briefly summarized as follows: Upon the application of pressure at the centralized source, from which the knuckle bearings are supplied with lubricant, the drip plug 32 will slowly deliver say a dozen drops of lubricant, which will drip thorugh port 35 into well 36. A small portion of such lubricant will pass along the flat 41 from which some will spread laterally to lubricate the upper king pin bearing 18 and the rest will pass onward into the radial bore 42 and thence flow downward through axial bore 43 and by way of radial bore 45 to peripheral groove 46 to lubricate the ball thrust bearing 20, the excess passing downward toward the well 48, lubricating the lower king pin bearing 19 on its way down, excess that has risen from well 48 overflowing past the ball thrust bearing. The longitudinal bore 43 permits ready flow of lubricant by reason of its large diameter and by reason of the fact that any air displaced in such flow readily passes through radial bore 43' to enter the annular well 36 to thereby replace the lubricant which has passed from said annular bore into the king pin bore.

A considerable portion of the lubricant from the well passes downward along the oblique wall 56 of notch 55 in the upper bushing 18, where it is intercepted by the inlet end of the oblique pipe 52, from which it flows downward by gravity. This lubricant is directed through the relatively large cylindrical tube 64 into the drag link pipe 58, air blocking being prevented by reason of the large diameter of the parts, such air as is displaced passing up along the upper side of the pipe 52 into the well to replace the oil that has escaped therefrom. The lubricant admitted is thus readily deposited on top of that trapped in the downward bend of pipe 58 and causes a corresponding rise of lubricant at the bearing end thereof with consequent delivery to the drag link bearing surface. Some of the lubricant that has trickled along the cylindrical tube 64 is intercepted by the tangs 68 and thereby directed outward to flow into branch 62 and pipe 63 which leads to the tie rod bearing. The large diameter conduit 63 from the dividing fitting branch 62 to the tie rod bearing outlet presents a continuous column of lubricant only of the height of the bearing stud 25 thereof, which is insufficient to exert a siphoning effect upon the steering arm conduit.

While I may use a conduit that is large from end to end, an equally satisfactory operation ensues as noted by making the ends of the conduit small. This is particularly useful in motor vehicles where it might not be possible to accommodate a large inlet or a large outlet by structure of standard size. A pipe having a small inlet and a small outlet, even one sealed at the inlet end, is adapted to permit oil to flow from the upper end to the lower end without having that flow force the air out of the intervening pipe of larger diameter. It, therefore, follows that any oil put into the top end of such pipe causes emission promptly of a corresponding quantity of oil at the lower end of the pipe, so that such pipe even though not vented at the top, will promptly transmit oil from the top to the bottom without the time interval required to fill it up.

It will be seen that the conduit is rigidly sustained along the structural parts of the knuckle and in non-flapping relationship with respect thereto and is inherently protected preferably by being arranged on the rear and protected sides of the arms, so that it is unlikely to be injured in use. It will also be noted that the king pin, the drag link and the tie rod bearings each receive clean oil direct from the distributing well 36, said bearings being supplied in parallel. The king pin bearing surface is completely enclosed as shown, avoiding the possibility of entry of dirt, dust or water or the leak of lubricant therefrom, so that only minute quantities of lubricant need be and are supplied thereto through the restricted passage 41 and the bearing surface is yet effectively lubricated. The difficulties and reorganizations needed for one or more of the other bearings to be supplied with lubricant derived from a bearing of the king pin are thus obviated.

Thus, even though the oil-soaked gasket 37 at the top of the knuckle, in excluding dirt, substantially seals against venting or entry of air, the flow of lubricant nevertheless takes place as if the system were vented, the air within the system merely remaining or moving about therein, out of the path of flowing lubricant, and never becoming imprisoned between columns or bodies of lubricant. As lubricant passes out of any pipe to a bearing, air from another part of the system may enter to maintain substantially atmospheric pressure in the connecting piping between the bearings. Without using large axial holes in the ball studs, and without using large weakening radial holes in the king pin of a steering knuckle, I thus reconstitute the parts so that the desired quantity of oil flows to each bearing that I desire to lubricate, as if it flowed down open troughs by gravity, reaching its terminals promptly after the oil has been supplied to the central distributing place, just as promptly as if there were no tendency of the parts to siphon from one to the other, and as if no air blocking were present, the delivered oil, moreover, remaining clean in transit.

It will be seen that by the arrangement described, each of the bearings of the knuckle receives by ordinary gravity flow, a sufficient supply of lubricant for the desired purposes, the proportionate shares of lubricant to the various bearings being determined by the large size of tube 64 and the number and size of the tangs 68 therein. None of the lubricant once delivered to a higher bearing, will subsequently be abstracted therefrom by siphoning through a bearing at lower level.

While I have shown the invention applied to the knuckle at the steering side of the vehicle which has both tie rod and drag link bearings, it will be understood that the features thereof insofar as they are needed, would also be applied to the other knuckle, which is devoid of the drag link. In that case, the pipe 63 may be formed in a unitary length with the pipe 52 or be connected through a coupling applied to the knuckle by a lug similar to lug 51 in Fig. 3. The large diameter of pipe 63 would be preferred to avoid the possibility of siphoning through the tie rod bearing, lubricant that might be trapped in the king pin bore.

While the invention has a preferred application to the lubrication of steering knuckles, it will be understood that certain of the broader features thereof are of more general application in other relations and more especially in relations in which it is desired to lubricate from a remote source by gravity flow, a bearing at level higher than part of the pipe line leading thereto, especially where the same source is to supply concurrently therewith, one or more other bearings at different levels. The principle of the invention may accordingly, be applied to the lubrication of brake rigging and the steering lever of motor vehicles.

In Fig. 5 I have shown a modification in which the upper bushing 70 instead of having the notch shown in Fig. 4 is provided with a peripheral groove 71 at its exterior to which communication from the well 36' is established by a plurality of longitudinal grooves 72 leading thereto from the upper end of the bushing. By this arrangement, it will be seen that the bushing need not be applied in the upper clevis bearing in one particular position for registry of a notch with the pipe 52' as in Fig. 4, but may be inserted in any relation, the lubricant flowing from the well through the notches 72 to the groove 71 from which it passes onward through the oblique pipe 52' for division in the manner shown and described above.

The broader claims to modified bushing constructions for distribution of lubricant between two or more bearing surfaces are presented in applicant's copending case Serial No. 13,139, filed March 5, 1925.

In the embodiment shown, I have also shown a modified form of terminal for the upper end of pipe 52'. A short tube 73 is fitted in a correspondingly counterbored hole 77 of the upper knuckle clevis. The outer end of pipe 52' is enlarged as at 74 to encircle the protruding end of tube 73, affording a shoulder 75 abutting the end of said tube. The lubricant passing by gravity to and through pipe 52', the joint will transmit without leak.

The terminal construction referred to is claimed in my copending application Serial No. 429,539 filed February 19, 1930.

By the terms control, adjacent, subsidiary, carried, and/or associated bearings, as utilized in the accompanying claims is included the pivotal control bearings such as the upper and lower king pin bearing, and also the thrust bearing, which are located internally of the knuckle; the steering actuating controlling bearings such as the drag link and tie rod bearings which are located externally of the knuckle; and other bearings associated with, positioned about, or located adjacent to the knuckle which are adapted to receive lubricant from the same source that supplies said knuckle bearings proper.

I claim:—

1. In a motor vehicle, in combination, an axle, a knuckle, a king pin affording a pivot mount for the latter upon said axle, said knuckle having a tie rod bearing extending downward, a curved steering arm drooping downward and having an upwardly extending outer end with a drag link bearing thereon at a level higher than that of said tie rod bearing, means for supplying both of said bearings by gravity flow from a part on said knuckle higher than said bearings, said means including a dividing fitting affixed to said knuckle and substantially sealed against admission of air thereto from outside said knuckle, branch pipes supplied from said dividing fitting, one extending to said tie rod bearing, the other following the curvature of said steering arm and extending to said drag link bearing, the conduit leading to the tie rod being constructed and arranged to preclude the formation of a lubricant column therein of weight sufficient to exert a siphoning action on the lubricant in said steering arm conduit.

2. In a steering knuckle, in combination, a tie rod bearing, a steering arm having an upwardly extending bearing stud at its outer end, a dividing fitting secured to said knuckle, a pipe from one branch of said dividing fitting extending generally downward to supply the bearing of said tie rod, a pipe connected to the other branch of said fitting and extending along the structure of the knuckle and along the length of the steering arm to the bearing at the outer end thereof, the latter branch of said dividing fitting extending to a level lower than that of lubricant trapped in the steering arm conduit and being of diameter sufficiently large to allow passage of lubricant around any air therein, whereby the entry of lubricant to said conduit will not become blocked.

3. In a steering knuckle, in combination, a downwardly extending tie rod ball stud, a steering arm having an upwardly extending ball stud, a lubricant feeding passage carried by said knuckle and extending from near the upper end thereof, a dividing fitting secured to said knuckle and supplied from said passage, a pipe from one branch of said dividing fitting extending generally downward to supply the ball stud of said tie rod, a pipe connected to the other branch of the fitting and extending along the structure of the knuckle and along the length of the steering arm to the ball stud thereof, the latter branch of said dividing fitting extending to a level lower than that of lubricant trapped in the steering arm conduit, said lubricant feeding passage and said dividing fitting being of diameter sufficiently large to allow passage of lubricant around any air therein, whereby the entry of lubricant to said conduit will not become blocked.

4. In a steering knuckle, in combination, a downwardly extending tie rod ball stud, a steering arm drooping downward and having an upwardly extending ball stud, a dividing fitting secured to said knuckle, a pipe from one branch of said dividing fitting extending generally downward to said tie rod ball stud, a pipe connected to the other branch of said fitting and extending along the structure of the knuckle and along the length of the steering arm to the steering arm ball stud, the latter branch of said dividing fitting extending to a level at least as low as that of lubricant trapped in the drooping steering arm conduit and being of diameter sufficiently large to permit passage of lubricant around any air therein, whereby the entry of lubricant to said conduit will not become blocked, the pipe leading to said tie rod bearing being of diameter sufficiently large to prevent the formation of a continuous column of lubricant therein of weight sufficient to exert a siphonic action upon the lubricant in the steering arm conduit.

5. In a steering knuckle assembly, in combination, a king pin, a steering knuckle having a bearing with respect thereto, a lubricant inlet near the upper end of said king pin, means sealing said inlet against entry of air, an arm on said knuckle having a bearing at its outer end at a level higher than the lower end of said king pin, lubricant dividing means communicating with a passage lengthwise of said king pin, which leads to the lower king pin bearing and a lubricant pipe in flow-intercepting relationship with respect to said dividing means and extending along said knuckle to said bearing, the average cross-sectional area of said king pin bore being of magnitude sufficient to permit passage of lubricant by the air therein, thereby preventing the exertion of a siphonic action upon the conduit leading to said knuckle bearing.

6. In a lubricating system for supplying from a single source by gravity flow two bearings asymmetrically arranged so that one would tend to receive lubricant more readily than the other, conduits leading to the bearings, a dividing fitting supplying said conduits and having a tubular passage therein tending to supply all of the lubricant to the bearing that tends to receive the lesser amount, said tube of diameter so large that the lubricant supplied therethrough tends to flow along the wall thereof and having one or more ports delivering therefrom to the other conduit for supplying the other bearing.

7. In a gravity lubricating system for supplying a pair of bearings by gravity flow from a single source at a higher level, an open dividing fitting supplied from the source, one branch of said fitting receiving all of the lubricant from the source, said branch having a baffle directing some of the lubricant therein to the other branch thereof, and pipes from the branches of said fitting to the respective bearings.

8. In a lubricating installation, in combination, a pair of bearings at different levels, pipes leading to said bearings, a dividing fitting having branches supplying said pipes, the pipe leading to the upper of said bearings including a length in which lubricant is trapped, said fitting having a direct open connection tending to deliver all of the lubricant into the pipe leading to said latter bearing and including a wall along which the lubricant tends to trickle, and one or more ports in said wall releasing some of the lubricant therefrom to the other branch of the dividing fitting to supply the pipe leading to the lower of the bearings, the lubricant conveying parts above the level of trapped lubricant having a cross-sectional area sufficient to permit passing of lubricant around any air therein.

9. A steering knuckle having a pair of bearings carried thereby, means for supplying lubricant thereto concurrently from a single source, said means including a dividing fitting carried by the knuckle, pipes connected to the respective outlets of said fitting and leading along the structure of the knuckle to the bearings, said dividing fitting effecting the division of the lubricant between the two conduits in desired proportions and comprising a downwardly extending tubular conduit leading to one of the pipes and of diameter sufficient to cause the lubricant therethrough to trickle along the wall thereof and one or more ports in said tube delivering a part of the lubricant to the other branch of the dividing fitting to supply the other pipe.

10. In a gravity lubricating system, a flow dividing branched fitting having a pipe length therein extending substantially from the inlet to one of the outlets thereof, said pipe length having one or more ports in communication with the other outlet of said fitting.

11. In a chassis lubricating installation, in combination, a knuckle having a downwardly extending tie rod bearing, a steering arm having a bearing at its outer end at level higher than the length of said arm, conduits extending along the structure of the knuckle to the respective bearings thereof, the conduit along the steering arm thereby determining a trap in which lubricant is normally lodged, a dividing fitting secured to the knuckle and delivering to the inlet ends of said conduits, said dividing fitting extending to substantially the level of the trapped lubricant, being of cross-sectional area sufficient to permit passage of lubricant around any air therein, thereby preventing blocking of lubricant for the steering arm, the conduit to the tie rod bearing being of diameter sufficiently large to preclude the formation of a column of lubricant therein of weight sufficient to exert a siphonic action upon the trapped lubricant along the steering arm.

12. A steering knuckle, carrying a downwardly extending tie rod bearing, and carrying a steering arm having a bearing at its outer end above the main length of said arm, means for lubricating said elements comprising an inlet to said knuckle at level higher than said bearings and contiguous to the king pin, a conduit supplied from said inlet, a dividing fitting having an inlet supplied from said conduit, said dividing fitting secured to said knuckle, a pipe connected to one of the outlets of said dividing fitting and extending generally downward to said tie rod bearing, a second pipe connected to the other outlet of said dividing fitting and extending along the length of said steering arm to the bearing thereof, the entire length of the piping installation above the maximum level of lubricant trapped in said steering arm conduit being of diameter sufficiently large to permit entry of lubricant around any air therein, the mean cross-sectional area of the tie rod conduit being sufficient to prevent the formation of a lubricant column therein of weight sufficient to exert a siphonic action upon the lubricant in the steering arm conduit.

13. In combination with a steering knuckle having a tie rod bearing and a steering arm having a bearing at its outer end, a lubricating installation comprising a dividing fitting secured to said knuckle, a pipe from one outlet of said dividing fitting extending generally downward to supply the bearing of said tie rod, another pipe connected to the other outlet of said fitting and extending along the structure of the knuckle and along the length of the steering arm to the bearing at the outer end thereof, said dividing fitting being about at or above the level of the steering arm bearing.

14. In combination with a steering knuckle having a tie rod bearing and a steering arm having a drag link bearing; a lubricating installation comprising a lubricant feeding passage carried by said knuckle initiating near the upper end thereof, a dividing fitting secured to said knuckle and supplied from said passage, a pipe from one outlet of said dividing fitting secured to said knuckle extending generally downward to supply the tie rod bearing and a pipe connected to the other outlet of the fitting and extending along the structure of the knuckle and along the length of the steering arm to the bearing thereof, the inlet and outlet passageways in said dividing fitting being of diameter sufficiently large to allow passage of lubricant around any air therein, whereby the entry of lubricant to said pipes will not become blocked.

15. In combination with a steering knuckle having a tie rod bearing and a steering arm having a drag link bearing; a lubricating installation comprising a lubricant feeding passage carried by said knuckle initiating near the upper end thereof, a dividing fitting secured to said knuckle and supplied from said passage, a pipe from one outlet of said dividing fitting secured to said knuckle extending generally downward to supply the said tie rod bearing and a pipe connected to the other outlet of the fitting and extending along the structure of the knuckle and along the length of the steering arm to the bearing thereof, the dividing opening in said fitting being of insufficient width to permit reverse flow of lubricant and air.

16. In a motor vehicle of the type including an axle, a knuckle having a pivot mount thereon with upper and lower bearings and other bearings positioned adjacent to said pivotal mount; the combination therewith of a lubricant installation for the lower pivotal bearing and at least one of the adjacent bearings comprising a lubricant inlet, a distributing receiver above said lower pivotal bearing receiving lubricant from said inlet, an interior conduit system adjacent said pivotal mount supplying said lower pivotal bearing, an exterior conduit system for supplying at least two of said adjacent bearings and a dividing means upon said exterior conduit system to determine the proportion of lubricant supplied to said adjacent bearings.

17. In a lubricating installation for associated bearings of a steering knuckle pivotally mounted upon an axle and carrying two control bearings, a lubricant source adjacent the top of said pivotal mount and a conduit system from said lubricant source to said control bearings supported upon said knuckle initially consisting of a downwardly extending conduit which is later bifurcated into two conduits a substantial distance below said lubricant source and each one of said bifurcated conduits leading to a control bearing.

18. In a lubricating installation for associated bearings of a steering knuckle pivotally mounted on an axle and carrying drag link and tie rod bearings, a lubricant source adjacent the top of said king pin, a single conduit leading downwardly from said lubricant source and rigid with the knuckle structure, individual conduits leading to said drag link bearing and to said tie rod bearing joining said aforementioned single conduit a substantial distance below said lubricant source and flow proportioning means at the junction of said single and individual conduits.

19. In an installation for lubricating a plurality of bearings by gravity flow of lubricant, in combination, a lubricant source, a conduit system leading from said lubricant source to said bearings and a dividing arrangement to proportion the lubricant between conduits of said system consisting in part of a downwardly inclined wall provided with one or more openings, means for flowing lubricant from said source downwardly upon said wall and deflecting means positioned adjacent said openings to interrupt the lubricant flow and to cause part of the lubricant to pass into said openings.

20. In a lubricating installation for lubricating a plurality of bearings by gravity lubricant flow, in combination, a lubricant source, a conduit system leading from said source to said bearings and a dividing arrangement to proportion the lubricant between conduits of said system comprising an inside passageway communicating with two conduits of said system to receive and discharge lubricant, an outside passageway communicating with a third conduit to discharge lubricant, said outside passageway communicating with the inside passageway by a series of small openings and a ridge arrangement positioned adjacent said openings to break the flow of lubricant along the inside passageway and cause part of it to flow into said outside passageway.

21. In an installation for lubricating a plurality of bearings by gravity lubricant flow, in combination, a lubricant source, a conduit system leading from said source to said bearings and a dividing arrangement to proportion the lubricant between conduits of said system consisting in part of a cylinder, a chamber associated with said cylinder communicating with said cylinder by means of openings in the sides thereof, ledges below said openings, means for flowing lubricant from a conduit of said system downwardly over said sides and ledged arrangement and means for conveying the separated lubricant in said cylinder and in said chamber to other conduits of said system.

22. In an installation for lubricating a plurality of bearings by gravity lubricant flow, in combination, a lubricant source, a conduit system conveying lubricant from said lubricant source to said bearings and a dividing arrangement to proportion the lubricant between conduits of said system consisting in part of a cylindrical wall, a passageway concentric with said wall, openings in said cylindrical wall leading into said passageway, means to flow lubricant from one of said conduits down over said cylindrical wall whereby the lubricant will divide, part flowing through said openings into said passageway and means for conveying the divided lubricant into other conduits of said system.

23. In combination with a mechanism having an elevated bearing with a central element, an encircling element and a bushing therebetween fixed in the encircling element, the axis of said bearing being substantially inclined to the horizontal, and lower bearings; a lubricant source above said elevated bearing, a conduit system leading from adjacent said elevated bearing to said lower bearings and longitudinal channels along the inner and outer surfaces of said bushing feeding said conduit system and proportioning the lubricant between said lower bearings.

24. In a motor vehicle of the type having an axle and a knuckle, one of which is clevised and the other of which is provided with an eye embraced by said clevis, a king pin fixed in said eye and having upper and lower bearings in said clevis, bushings associated with said upper and lower king pin bearings and a control bearing carried by said knuckle; a lubricating installation comprising a lubricant source above said upper king pin bearing, a chamber above said upper king pin bearing receiving lubricant from said source, piping leading from adjacent said upper king pin bearing to said control bearing, and longitudinal and peripheral grooves in the outer surface of said upper king pin bearing bushing feeding lubricant from said chamber to said piping.

25. In a motor vehicle of the type having an axle and a knuckle, one of which is clevised and the other of which is provided with an eye embraced by said clevis, and a king pin fixed in said eye and having upper and lower bearings in said clevis; a lubricating installation comprising a source above said upper king pin bearing, a chamber above said upper king pin bearing receiving lubricant from said source, and supplying it to the upper king pin bearing, an axial bore through said king pin supplying lubricant to said lower king pin bearing, a radial bore in said king pin for receiving lubricant from said upper king pin bearing and supplying it to said axial bore and means for venting said axial bore into said receiving chamber.

26. In combination with a structure, including an axle and a steering knuckle having a pivotal mount thereupon and carrying upper and lower control bearings; a lubricating installation comprising an inlet compartment adjacent the top of the pivotal mount, a conduit system with a single inlet fed from said compartment, said system leading from said compartment to the upper one of said bearings, conduit means supplied from said conduit system leading to the other of said bearings, and means on said system and said conduit means to determine substantially the proportion of the lubricant supplied to each control bearing.

27. In combination with a mechanism having an elevated bearing with a central element, an encircling element and a bushing therebetween fixed in the encircling element, the axis of said bearing being substantially inclined to the horizontal, and lower bearings; a lubricant source above said elevated bearing, conduit systems leading from adjacent said elevated bearing to said lower bearings and longitudinal channels along the inner and outer surfaces of said bushing feeding said conduit systems and proportioning the lubricant between said lower bearings, the channel along the outside of the bushing consisting of a groove therein and the channel along the inside of the bushing consisting of a flat in the central element.

28. In combination with a mechanism having an elevated bearing with a central element, an encircling element and a bushing therebetween fixed in the encircling element, the axis of said bearing being substantially inclined to the horizontal, and lower bearings; a lubricant source above said elevated bearing, conduit systems leading from adjacent said elevated bearing to said lower bearings and longitudinal channels along the inner and outer surfaces of said bushing feeding said conduit system and proportioning the lubricant between said lower bearings, the mechanism being provided with internal and external conduit systems, the inner channel feeding the internal conduit system and the outer channel feeding the external conduit system.

29. In a motor vehicle, in combination, an axle, a king pin therethrough and rigid therewith, a knuckle having a clevis straddling said axle end and having bearings at the ends of said king pin, lubricant collecting means coaxial with and communicating with the bearing surfaces at the top of said king pin, a bore through said king pin draining lubricant from said collecting means and delivering to the lower king pin bearing, a control arm on said knuckle having a bearing at its outer end at level higher than that of the lower bearing of said king pin, the conduit to said arm bearing extending between its ends below said bearing thereby determining a trap, the bore in the king pin being of mean diameter sufficiently large to permit simultaneous passage of lubricant and air in opposite directions, thereby to prevent the formation of a continuous lubricant column in said king pin of weight sufficient to exert a siphonic action upon the lubricant in the conduit along said control arm.

30. A steering knuckle having, in combination, a king pin pivot mount with bearings near the ends thereof, a tie rod arm rigid with said knuckle and extending generally downward from the lower end thereof, a distributor near the upper end of the king pin and supplying the upper bearing thereof, the king pin having a longitudinal bore supplied from said distributor and feeding the lower bearing thereof, a pipe along the structure of the knuckle and in flow-intercepting relationship with respect to said distributor extending to the tie rod bearing, said parts affording a continuous open passage from the king pin bearings through the tie rod bearing, said means precluding the formation in said passage of a vacuum of degree sufficient for siphoning lubricant from the king pin through the tie rod bearing.

31. A steering knuckle having, in combination, a king pin pivot mount with bearings near the ends thereof, a tie rod arm rigid with said knuckle and extending generally downward from the lower end thereof and having a bearing at its outer end, a fixed lubricant inlet, a distributor substantially rigid with said knuckle and supplied from said inlet, oil-soaked gasket means preventing the entry of dust between the inlet and the distributor, a longitudinal bore in said king pin supplied from said distributor and leading to the lower king pin bearing, a pipe along the structure of said knuckle to supply the tie rod bearing, said pipe being of diameter sufficiently large to permit passage of lubricant around any air therein, thereby to prevent the formation of a continuous column of lubricant therein of weight sufficient to exert a siphonic action upon any lubricant in the king pin bore.

32. The combination set forth in claim 31 in which the tie rod bearing constitutes a ball stud extending downward therefrom and in which said ball stud has a lubricant conveying bore of diameter sufficiently small to sustain a continuous column of lubricant therein.

33. A steering knuckle, a king pin pivot mount therefor having bearings near the ends thereof, said knuckle having a steering arm rigid therewith with a bearing at its outer end at a level higher than the length of said arm and at a level higher than the lower king pin bearing and a downwardly extending tie rod bearing at another jaw of said arm, a distributor carried near the upper end of said knuckle, conduits supplying from said distributor, the king pin bearings, the tie rod and the steering arm bearings, said conduits including a longitudinal bore in said king pin communicating with said distributor at its upper end and with the lower king pin bearing at the lower end, a piping installation in closed flow-intercepting relationship with said distributor and including a branch extending downward along the knuckle to the tie rod bearing thereof, and a second branch extending along the knuckle and lengthwise along the steering arm to the bearing thereof, means precluding the formation in said bore and said piping of a vacuum of degree sufficient for siphoning of lubricant from said steering arm bearing to either said king pin or said tie rod bearing or from said king pin bore to said tie rod bearing.

34. A steering knuckle, a king pin bearing mount therefor having bearings near the ends thereof, a steering arm rigid with said knuckle and having a bearing outlet at a level higher than the main length of said arm, a tie rod bearing outlet on said arm, means for lubricating by gravity flow from a common source, said king pin, tie rod and steering arm bearings, said means comprising a distributor coaxial with said king pin and at the upper end thereof, a longitudinal bore in said king pin supplied from said distributor and delivering to the lower king pin bearing, a piping system carried by said knuckle and in closed flow-intercepting relationship with said distributor, said system including one branch extending along the length of said steering arm to the tie rod bearing; and another branch extending along the length of said steering arm to the bearing outlet thereof, the entire height of conduit between the inlet and substantially the level of the steering arm bearing being of diameter sufficiently large to permit passage of lubricant around any air therein, thereby preventing air lock, and means precluding the formation in the lubricant conveying passageways of a vacuum of degree sufficient for siphoning of lubricant from the steering arm through either the king pin or the tie rod or from the king pin through the tie rod.

35. The combination set forth in claim 34 in which the distributor is supplied from a fixed inlet, in which dust excluding means is interposed between said inlet and said distributor, thereby preventing venting and in which the king pin bore and the main length of conduit along to the tie rod bearing are of diameter sufficiently large to permit flow of lubricant therethrough around any air therein, thereby preventing siphoning.

36. In a knuckle for a motor vehicle, in combination, an axle, a knuckle, a king pin affording a steering mount for said knuckle, said king pin having a bearing bushing near its upper end, an annular lubricant well above said bushing, having restricted communication with the bearing surface thereof, and a downwardly inclined pipe having its inlet in communication with an annular groove at the exterior surface of said bushing, said groove supplied from said well through one or more longitudinal grooves on the exterior of said bushing.

37. In a motor vehicle, the combination of an axle, a knuckle, a king pin affording a bearing for said knuckle with respect to said axle, a control bearing on said knuckle at level lower than the upper end of said king pin bearing, a lubricant inlet rigid with said axle communicating with the upper part of said king pin bearing, a lubricant duct longitudinally of said king pin to the lower bearing thereof, a conduit carried by said knuckle and extending from the upper part of said king pin to said control bearing, the upper part of said king pin bearing blocking leakage of lubricant to degree sufficient to permit flow therefrom through said king pin duct and through said conduit in parallel.

38. In a motor vehicle of the type including an axle, a knuckle having a pivotal mount thereupon and external control bearings, the combination therewith of a lubricating installation comprising a conduit system conveying lubricant through and to the pivotal mount and external bearings, consisting in large part of passageways within the knuckle structure and pivotal mount, a distributing receiver chamber at the upper end of said pivotal mount, means to admit lubricant to said receiver chamber and restricted outlet openings in said receiver chamber ensuring communication between the receiver and the conduits of said system and serving to proportion properly the lubricant flowing into the various conduits of said conduit system.

39. In a motor vehicle of the type including an axle, a knuckle having a king pin pivot mount thereon with a pivotal bearing substantially below the upper end of the king pin and having an outward extending arm carrying a control bearing; the combination therewith of a lubricating installation comprising a lubricant installation comprising a lubricant receiver chamber adjacent the upper end of the king pin, an inlet supplying lubricant to said receiver chamber, an exterior passageway along part of said knuckle for delivering lubricant from said receiver chamber to said control bearing, an interior passageway within the knuckle structure to said king pin bearing and a restricted connection between the inlet and said interior passageway.

40. In a motor vehicle of the type comprising an axle and a knuckle having a king pin pivotal mount thereon with a bearing substantially below the upper end of the king pin and externally carrying a control bearing; the combination therewith of a lubricating installation comprising a distributing receiver chamber disposed adjacent the upper end of the king pin, an inlet supplying said receiver chamber, a lubricant conveying pipe carried by said knuckle leading to said control bearing, a bore in said king pin leading to said pivotal bearing and restricted connections between said receiver chamber and said pipe and bore.

41. In a motor vehicle of the type including an axle and a knuckle having a pivotal mount upon said axle with a pivotal bearing adjacent the lower end of the pivotal mount; the combination therewith of a lubricating installation comprising a lubricant distributor chamber adjacent the upper end of the pivotal mount, an inlet thereto, a restricted passage leading from said distributor chamber through the upper part of the pivotal mount and an axial bore in the pivotal mount supplied from said restricted passage and delivering to said pivotal bearing.

42. In a gravity lubricating system for a plurality of bearings, in combination, a lubricant supply, a conduit system leading to said bearings in lubricant-intercepting relationship with said supply and division means on said conduit system to proportion the lubricant flowing to the various conduits of said conduit system comprising inner and outer concentric cylindrical passageways, said passageways being fixed in respect to each other and the outer passageway being of annular form and enclosing the inner passageway, means to supply lubricant to one of said passageways and a fluid connection between said passageways so arranged that part of the lubricant supplied to one passageway will flow into said other passageway.

43. In a gravity lubricating system for a plurality of bearings, in combination, a lubricant supply, a conduit system in lubricant-intercepting relationship with and for conducting lubricant from said supply to said bearings and division means associated with said conduit system to proportion the amount of lubricant passing to the various bearings, said means including a cylindrical receiving chamber, a concentric tube positioned in respect to and having a communicating opening with said chamber so that it receives lubricant therefrom, and also forming a part of said conduit system, means to supply lubricant to said chamber and an additional outlet from said chamber other than through said opening to said tube, the additional outlet and the opening to said tube being related to give proper proportioning of lubricant therebetween.

44. Knuckle lubrication means including in combination with a steering knuckle assemblage of the type which includes a king pin with upper and lower pivotal king pin bearings and a subsidiary bearing, a distributing receiver chamber at the upper end of the king pin, means rigid with the axle to feed lubricant into said receiver chamber, an outside passageway in lubricant-intercepting relationship with said receiver chamber delivering lubricant to said subsidiary bearing and an inside passageway through the king pin in lubricant intercepting relationship with said feeding means and said member to the lower king pin bearing.

45. In a motor vehicle of the type including an axle, a knuckle, a king pin constituting a pivotal mount for said knuckle fixed to one of aforesaid elements and a clevis fixed to the other of said elements, the jaws of which encircle and bear upon the upper and lower ends of said king pin and other control bearings adjacent said pivotal mount; the combination therewith of a lubricating installation for the lower king pin and at least one of said adjacent bearings comprising a distributing receiver chamber adjacent the upper end of said king pin, separate conduits from said receiver chamber to said adjacent bearing and to said lower king pin bearing and an inlet adapted to supply lubricant to said receiver chamber, the conduit to the lower king pin bearing being enclosed within the knuckle structure and the inlets to the conduit to the lower king pin bearing and to the adjacent bearing being in the bottom of the receiver chamber.

46. In a motor vehicle of the type including an axle, a knuckle, a king pin constituting a pivotal mount for said knuckle fixed to one of said aforementioned elements, a clevis fixed to the other of elements, the jaws of which encircle and bearing upon the upper and lower ends of said king pin, and other control bearings adjacent said pivotal mount; the combination therewith of a lubricating installation for said upper and lower king pin bearings and at least one of said adjacent bearings comprising a lubricant receiver chamber adjacent the upper end of said king pin in direct communication with the upper pivotal bearing, a lubricant inlet feeding said receiver chamber, an external conduit from said receiver to said adjacent bearing and a bore through said king pin from said receiver chamber to the lower king pin bearing.

47. In a structure of the type including a swiveling element, a pin constituting a pivot mount for said element, and another bearing carried by the element at a different level than said pivotal bearing; the combination therewith of a lubricating installation for said pivotal and carried bearings comprising a lubricant supply from above said bearings and a conduit system in substantial part enclosed within said element with individual intercommunicating conduits in lubricant-intercepting relationship with said supply leading to said bearings, said conduit system in substantial part at least, being sufficiently wide to permit the reverse flow of air and lubricant.

48. In a structure of the type including a swiveling element carrying a bearing element and a pin constituting a pivotal mount for said element, said pivotal bearing and said carried bearing being at different levels; the combination therewith of a lubricating installation for said bearings comprising a lubricant supply from above said bearings, a conduit system in substantial part enclosed within said swiveling element in lubricant intercepting relationship with said supply and including individual conduits to each of said bearings, said individual conduits being in continuous open communication and means to prevent the formation of a siphoning passageway through said conduit system from the higher to the lower bearing.

49. In a motor vehicle of the type including an axle, a knuckle, a king pin constituting a pivot mount for said knuckle fixed to one of said aforementioned elements, a clevis affixed to the other of said elements, the jaws of which encircle and bear upon the upper and lower ends of said king pin, and other bearings adjacent said pivotal mount; the combination therewith of a lubricating installation for said lower king pin bearing and at least one of said adjacent bearings comprising a lubricant supply from above said bearings, a conduit system in substantial part at least enclosed within said knuckle from said source, said system having individual conduits leading to said adjacent bearing and to said lower king pin bearing, the individual conduits of said system to each bearing being in continuous open communication and said conduit system in substantial part at least being sufficiently wide to permit of the reverse flow of air and lubricant.

50. In a motor vehicle of the type including an axle, a knuckle, a king pin constituting a pivot mount for said knuckle affixed to one of said aforementioned elements, a clevis affixed to the other of said elements, the jaws of which encircle and bear upon the upper and lower ends of said king pin, and another bearing adjacent said pivotal mount; and at level other than that of said lower king pin bearing; the combination therewith of a lubricating installation for said lower king pin bearing and said adjacent bearing comprising a lubricant supply from above said bearings and a conduit system in substantial part enclosed within the knuckle and having individual conduits leading from said supply to said adjacent bearing and to said lower king pin bearing, the individual conduits to each bearing being continuously intercommunicating and constructed and arranged to prevent the formation of a siphoning passageway between said adjacent bearing and said lower king pin bearing.

JOSEPH BIJUR.